United States Patent [19]
Imberg

[11] Patent Number: 5,806,488
[45] Date of Patent: Sep. 15, 1998

[54] ELECTRONIC ENGINE TIMING

[75] Inventor: Hans Imberg, Trigg, Australia

[73] Assignee: Transcom Gas Technologies Pty, Herdsman, Australia

[21] Appl. No.: 448,538

[22] PCT Filed: Dec. 14, 1993

[86] PCT No.: PCT/AU93/00650

§ 371 Date: Aug. 17, 1995

§ 102(e) Date: Aug. 17, 1995

[87] PCT Pub. No.: WO94/13949

PCT Pub. Date: Jun. 23, 1994

[30] Foreign Application Priority Data

Dec. 14, 1992 [AU] Australia ................................. PL6346
Mar. 12, 1993 [AU] Australia ................................. PL7823

[51] Int. Cl.⁶ .............................. F02P 5/15; F02D 41/34; F02D 43/04
[52] U.S. Cl. .......................... 123/414; 123/416; 123/478; 123/487
[58] Field of Search .................................... 123/414, 416, 123/417, 478, 487, 490, 643, 644

[56] References Cited

U.S. PATENT DOCUMENTS

| 4,232,368 | 11/1980 | Hill et al. ............................. 123/416 X |
| 4,494,509 | 1/1985 | Long et al. ........................... 123/418 X |
| 4,527,522 | 7/1985 | Cerny ....................................... 123/416 |

FOREIGN PATENT DOCUMENTS

| 50986/73 | 7/1974 | Australia . |
| 24620/77 | 11/1978 | Australia . |
| 45740/79 | 10/1979 | Australia . |
| 161124 | 11/1985 | European Pat. Off. . |
| 342376 | 11/1989 | European Pat. Off. . |
| 2022701 | 12/1979 | United Kingdom . |
| WO 87/04760 | 8/1987 | WIPO . |

OTHER PUBLICATIONS

Patent Abstracts of Japan, M–386, p. 106, JP,A, 60–17269, (Mitsubishi Denki, K.K.) Jan. 29, 1985.
Patent Abstracts of Japan M–587, p. 86, JP, A 61–279772, (Nippon Denso Co. Ltd.) Dec. 10, 1986.

Primary Examiner—Tony M. Argenbright
Attorney, Agent, or Firm—Caesar, Rivise, Bernstein, Cohen & Pokotilow, Ltd.

[57] ABSTRACT

An electronic timing system for producing precise timing control signals to the fuel injectors and ignition coils of an internal combustion engine. The system includes a cylinder cycle marker circuit (16) for generating an engine cycle reference signal based on the detected operational position of the engine as indicated by a TDC signal and a fly wheel teeth (FWT) signal. The system also includes a cylinder sequencer (22) for controlling the sequence of combustion in respective cylinders of the engine responsive to the engine cycle reference signal. A multiplying circuit (14) is provided for multiplying the incoming FWT signal to produce a high resolution engine rotation signal which is a programmable integer multiple of the FWT signal. Injector and ignition timing control signals can be delayed by timers (24, 26) with a programmable delay specified in terms of an integer multiple of the multiplied FWT signal, and can therefore be precisely set in terms of ° crank angle before TDC regardless of the engine speed. Furthermore, being angle referenced each programmable delay at least maintains the last calculated advance setting regardless of changes in engine speed.

18 Claims, 3 Drawing Sheets

ELECTRONIC ENGINE TIMING

FIELD OF THE INVENTION

The present invention relates to an electronic timing system and method for an internal combustion engine and relates particularly, though not exclusively, to such a system and method for a spark ignited, gas fuelled internal combustion engine.

BACKGROUND TO THE INVENTION

As the level of sophistication and reliability of electronic components and processing systems have improved by several orders of magnitude, electronic control systems are increasingly being incorporated in motor vehicles to replace functions previously performed by mechanical and/or electromechanical components and systems. Furthermore, the availability of such electronic components and systems has also opened the door to hitherto unforseen developments and improvements in the control and operation of the combustion cycle of internal combustion engines.

Many motor vehicles are now being manufactured with on-board computers and/or an engine control unit (ECU) to control the sequence of combustion in the respective cylinders of the engine. The engine is typically fuel injected and the ECU generates timing control signals for controlling the timing and sequence of operation of the injectors and spark ignition to provide optimum engine performance. In order to provide the correct timing control signals prior art ECUs must typically be supplied with engine speed and position signals, and a reference cylinder or top-dead centre (TDC) identification signal. Generally such signals are provided by a series of toothed wheels synchronously rotated by the engine crankshaft, and having a plurality of slots/projections thereon which are detected by a sensor to produce a pulse train. The repetition rate of these pulses is directly related to engine speed and pulse positions can be used to determine various engine cycle positions. The provision of such toothed wheels or slotted discs external to the engine creates additional hardware and adds to the mechanical complexity of the engine. Furthermore, the pulse trains generated are generally used to trigger counters or other means for producing time referenced timing control signals to controlling the sequence of combustion. However, with time referenced timing control signals timing errors can occur if the engine speed changes between successive timing calculations. For example, if the timing control signals were time referenced and the speed were to increase the instigation of these control signals would appear to retard by some angle instead of ideally becoming more advanced.

The present invention was developed with a view to providing an improved electronic engine timing system and method that can provide high resolution engine timing control signals used to control the sequence of combustion.

SUMMARY OF THE INVENTION

According to one aspect of the present invention there is provided an electronic timing system for an internal combustion engine, the system comprising:

an engine gear wheel teeth position sensor for detecting the rotation of a gear wheel of the engine, wherein each gear tooth of a periphery of the gearwheel is detected as it passes said gear wheel teeth position sensor to generate a gear wheel teeth signal;

an engine phase sensor for detecting a phase of the engine and for generating an engine phase signal every cycle of the engine;

a signal multiplying means for multiplying said gear wheel teeth signal by an integer multiple of the number of cylinders, N, in the engine to produce a high resolution engine rotation signal in the form of a pulse train, each pulse in said pulse train indicating a predetermined angular displacement of the engine;

means for generating a cylinder cycle reference signal for initiating a timing activity for each individual cylinder of the engine, wherein said cylinder cycle reference signal is generated responsive to said high resolution engine rotation signal and engine phase signal such that a predetermined number of pulses of said high resolution engine rotation signal, corresponding to one cycle of the engine as indicated by said engine phase signal, is divided up into N equal cylinder timing intervals, each cylinder timing interval being marked by a cylinder cycle reference marker; and, means for controlling the timing of combustion in respective cylinders of the engine responsive to said high resolution engine rotation signal, said engine phase signal and said cylinder cycle reference marker whereby, in use, the timing of combustion in each engine cylinder can be more precisely controlled to coincide with a desired operational position of the engine.

Preferably said signal multiplying means is a phase locked loop circuit.

Preferably said means for controlling the timing of combustion comprises a plurality of programmable timers adapted to provide a programmable delay specified in terms of a number of pulses of said high resolution engine rotation signal supplied to the timers from said signal multiplying means, for controlling the timing activity for each cylinder using said cylinder cycle reference markers as a timing reference.

According to another aspect of the present invention there is provided a method of electronic timing for an internal combustion engine, the method comprising:

detecting the rotation of a gear wheel of the engine, wherein each gear tooth on a periphery of the gear wheel is detected to generate a gear wheel teeth signal;

detecting a phase of the engine and generating an engine phase signal every cycle of the engine;

multiplying said gear wheel teeth signal by an integer multiple of the number of cylinder, N, in the engine to produce a high resolution engine rotation signal in the form of a pulse train, each pulse in said pulse train indicating a predetermined angular displacement of the engine;

generating a cylinder cycle reference signal for initiating a timing activity for each individual cylinder of the engine, wherein said cylinder cycle reference signal is generated responsive to said high resolution engine rotation signal and engine phase signal such that a predetermined number of pulses of said high resolution engine rotation signal, corresponding to one cycle of the engine as indicted by said engine phase signal, is divided up into N equal cylinder timing intervals, each cylinder timing interval being marked by a cylinder cycle reference marker; and, controlling the timing of combustion in respective cylinders of the engine responsive to said high resolution engine rotation signal, said cylinder cycle reference markers and said engine phase signal whereby, in use, the timing of combustion in each engine cylinder can be more precisely controlled to coincide with a desired operational position of the engine.

Preferably said step of controlling the timing of combustion comprises providing a programmable delay specified in terms of a number of pulses of said high resolution engine rotation signal for controlling the timing activity for each cylinder using said cylinder cycle reference markers as a timing reference.

BRIEF DESCRIPTION OF THE DRAWING

In order to facilitate a better understanding of the nature of the invention a preferred embodiment of the electronic engine timing system and method will now be described with reference to and as illustrated in the accompanying drawing, in which.

DETAILED DESCRIPTION OF PREFERRED EMBODIMENT

Figure 1A:
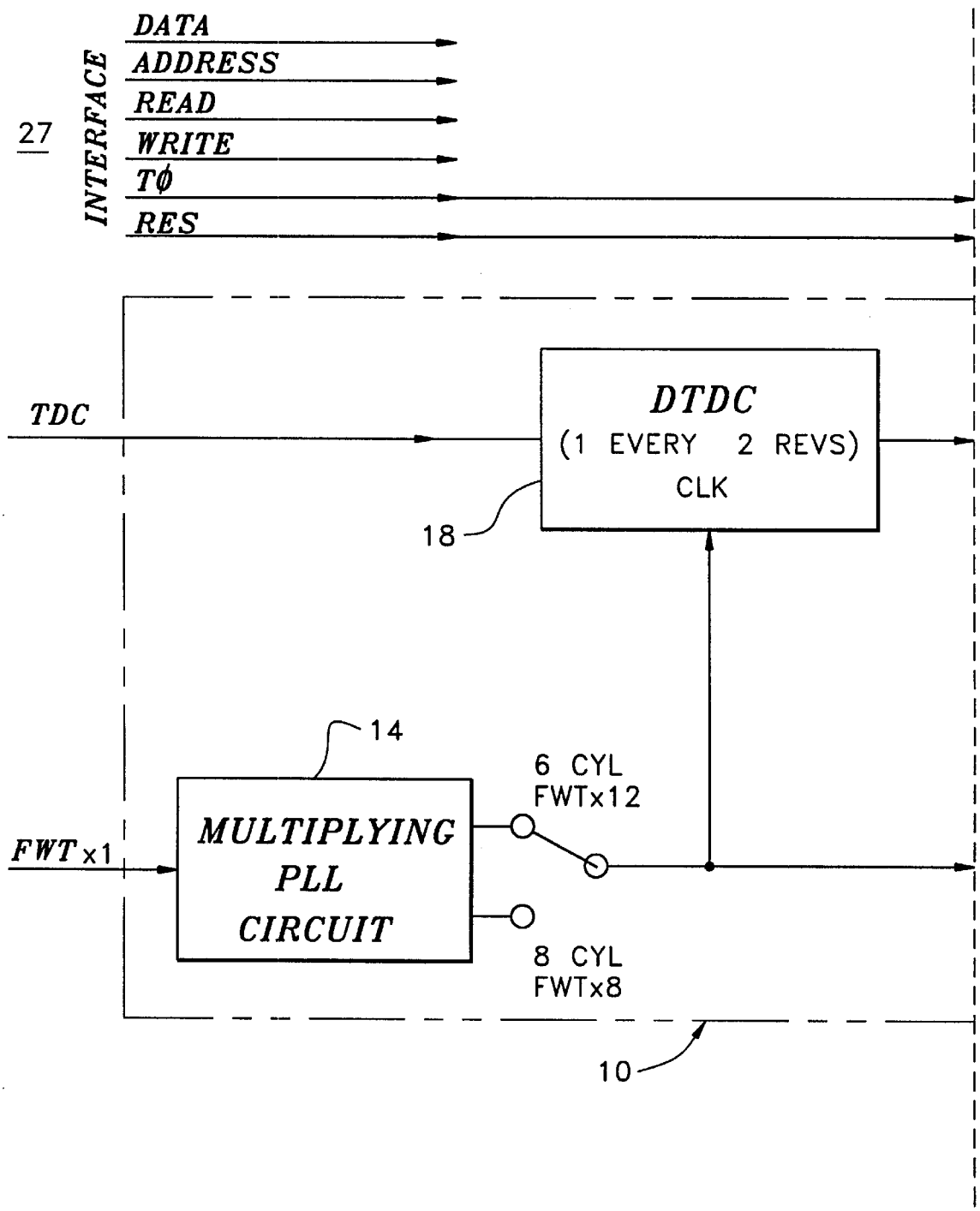
FIGS. 1A–1C are a functional block diagram of a preferred embodiment of the electronic engine timing system for a six cylinder spark ignited fuel injected engine.

In commonly owned International Publication No. WO 94/13946 (PCT/AV93/00649) an Engine Control Unit (ECU) is described for providing "drive-by-wire" control of a gas fuelled, spark ignited internal combustion engine. The ECU of WO 94/13936 comprises an ECU controller, typically a microprocessor based controller, with primary inputs of engine speed and throttle position. Engine speed is detected by a rotation sensor which generates a signal indicative of the engine speed. The rotation sensor produces a signal having a sinusoidal wave form with voltage and frequency characteristics that vary with the engine speed. The actual engine speed is calculated by the ECU controller by measuring the time between a fixed number of peaks and troughs in the signal.

Advantageously the signal from the rotation sensor is used by the electronic engine timing system to generate timing control signals for controlling the timing of fuel injection and ignition. The timing control signals are linked to the rotational position of the engine and are calculated in terms of angular displacement. This reduces timing errors which might occur between successive timing calculations in the event of changing engine speed. Since the timing control signals are angle referenced they can at least maintain their last calculated advance setting regardless of changes in engine speed.

The illustrated embodiment of the electronic engine timing system generates timing control signals for a six cylinder spark ignited, gas fuelled internal combustion engine. Each cylinder of the engine (not illustrated) is provided with a source of ignition, typically a spark plug, and a solenoid actuated fuel injector similar to that described in commonly owned International Publication No. WO 94/15092 (PCT/AV93/00672). The engine is provided with three ignition coils (not illustrated) in which each coil fires two spark plugs simultaneously. The function of the illustrated embodiment of the engine timing system is to produce precise timing control signals to the fuel injectors and to the ignition coils. Injection/ignition is cylinder sequential and is controlled to occur at the optimum times with respect to cylinder valve opening times and duration. In this embodiment the starting time and duration of these timing control signals are ultimately referenced to a signal derived from a position sensor (not illustrated) arranged so as to generate a pulsed engine phase signal precisely once every two engine revolutions, preferably so as to indicate the top dead centre (TDC) position of the engine. A full four stroke engine cycle consists of two revolutions of the engine and thus the engine phase signal provides an absolute combustion cycle reference.

An engine rotation sensor, typically an inductive (magnet and coil) sensor is positioned on the engine adjacent to the ring gear teeth of the engine fly wheel (not illustrated). The rotation sensor produces a signal of sinusoidal wave form having voltage and frequency characteristics that vary with the engine speed. The peaks and troughs in the sinusoidal wave form corresponding to the air gaps between the fly wheel teeth. Both the engine phase signal (TDC) and the engine rotation or fly wheel teeth (FWT) signal are employed by the illustrated embodiment of the electronic engine timing system and together can provide an indication of an operational position of the engine.

The illustrated embodiment of the engine timing system comprises means 10 for generating an engine cycle reference signal based on the detected operational position of the engine as indicated by the TDC signal and FWT signal. The system further comprises means 12 for controlling the sequence of combustion in respective cylinders of the engine responsive to the engine cycle reference signal whereby, in use, the timing of combustion in each engine cylinder can be precisely controlled to coincide with a desired operational position of the engine. Advantageously, the means 10 for generating an engine cycle reference signal in this embodiment comprises a multiplying circuit 14 which multiplies the incoming fly wheel teeth (FWT) signal frequency by 12 (in the case of a six cylinder engine), or by 8 (in the case of an eight cylinder engine). In this way, two revolutions of the engine can always be divided up into 6 intervals (in the case of a six cylinder engine) or 8 intervals (in the case of an eight cylinder engine) of equal angular displacement. Multiplying circuit 14 is typically a phase locked loop (PLL) circuit. The output signal from PLL circuit 14 has timing intervals which are a programmable integer multiple of the incoming FWT signal, which can then be used to obtain increased resolution and stability of the timing control signals, as will be described further below.

The means 10 for generating an engine cycle reference signal of this embodiment further comprises a cylinder cycle marker circuit 16 for producing a master reference timing pulse which is locked to the engine rotation, for the purpose of starting the timing activity of the individual cylinders. For a six cylinder engine the circuit 16 produces a master reference timing pulse or marker every 120°, and for an eight cylinder engine it produces a master reference timing pulse or marker every 90°. The cylinder cycle marker circuit 16 is enabled by the TDC signal and relies on the multiplied FWT signal from the PLL circuit 14 for it's clocking source. Hence, for the illustrated system, which is designed for a six cylinder engine, a 12 times FWT signal from PLL circuit 14 enables an exact one third (120°) engine cycle reference signal to be produced for any odd or even number of teeth on the engine fly wheel, which is linked to the rotational position or phase of the engine as indicated by the TDC signal.

A Delayed Top Dead Centre (DTDC) delay timer circuit 18 produces a master engine phase timing signal (delayed TDC signal) which is precisely set to a known and advantageous position relative to a significant position of engine rotation, for example, the actual top or bottom dead centre of a particular cylinder piston, with a resolution determined by the multiplied FWT signal from PLL circuit 14 which is used as it's clocking source. The master engine phase timing signal from delay timer circuit 18 passes through a DTDC enable circuit 20 before being supplied to the cylinder cycle marker circuit 16. The function of the enable circuit 20 will be described below.

The means 12 for controlling the sequence of combustion in respective cylinders of the engine comprises a cylinder sequencer 22 for generating timing control signals which individually identify the cycle periods for each engine cylinder, based on the cylinder cycle marker intervals produced by cylinder cycle marker circuit 16. The timing control signals from cylinder sequencer 22 are in the form of six pulses which appear sequentially on output lines 1 to 6 of the cylinder sequencer 22 which are supplied as dating pulses to the respective Delay till Injector On (DIO) timers 24 and Delay till Coil On (DCO) timers 26.

There are six DIO timers 24, one for each of the fuel injectors, and three DCO timers 26, one for each ignition coil. Each of the DIO timers 24 produces a programmable delay based on engine rotation angle referenced to the individual cylinder sequence timing control signals from cylinder sequencer 22. This programmable delay indicates the point, in terms of angular rotation of the engine, at which the sequenced injector is commanded to open. Similarly, DCO timers 26 each produce a programmable delay based on engine rotation angle also referenced to the individual cylinder sequence timing control signal from cylinder sequencer 22. This programmable delay is the point, in terms of angular rotation of the engine, at which the sequenced cylinder ignition coil pair is commanded to start charging.

Figure 1B:
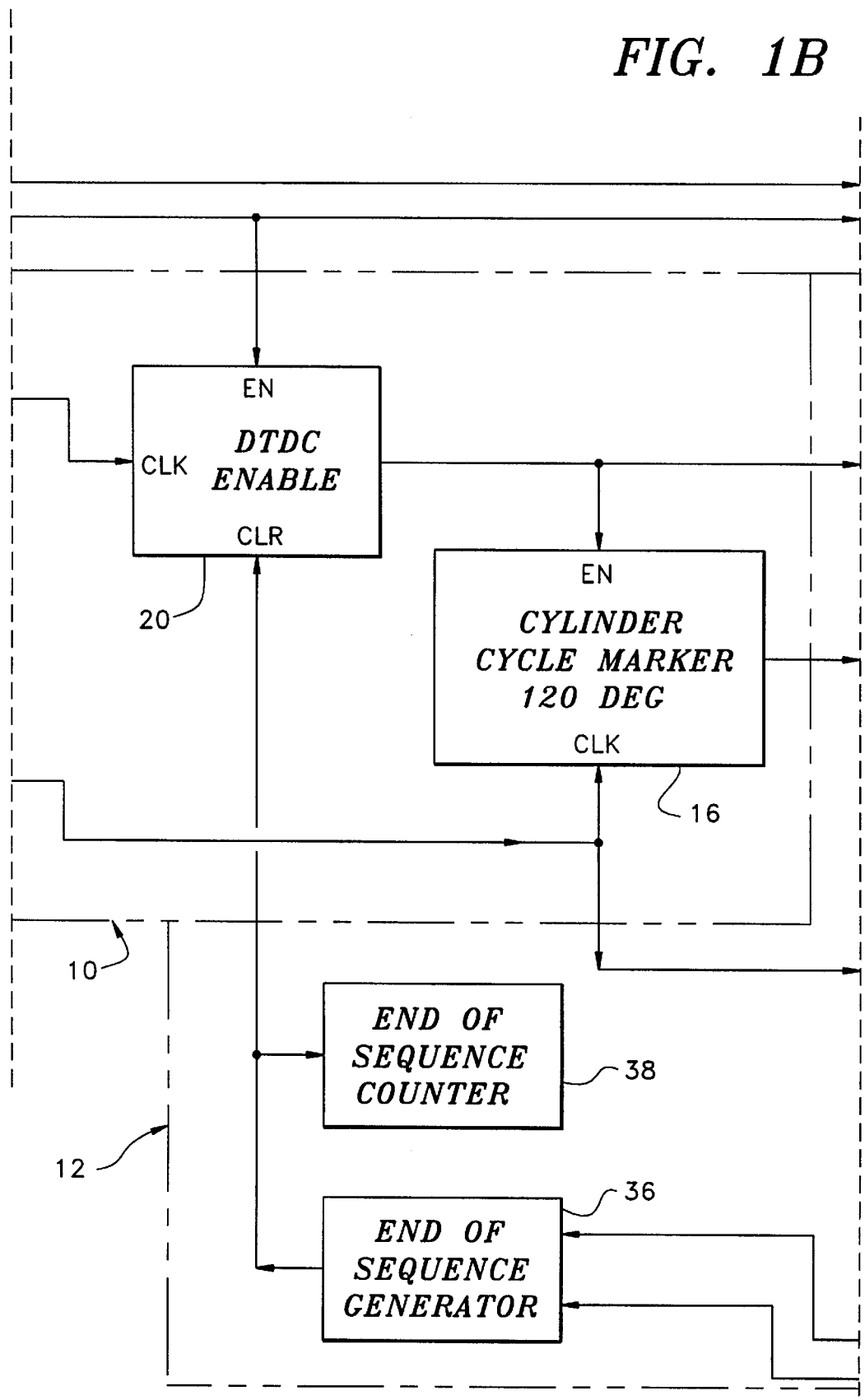
Figure 1C:
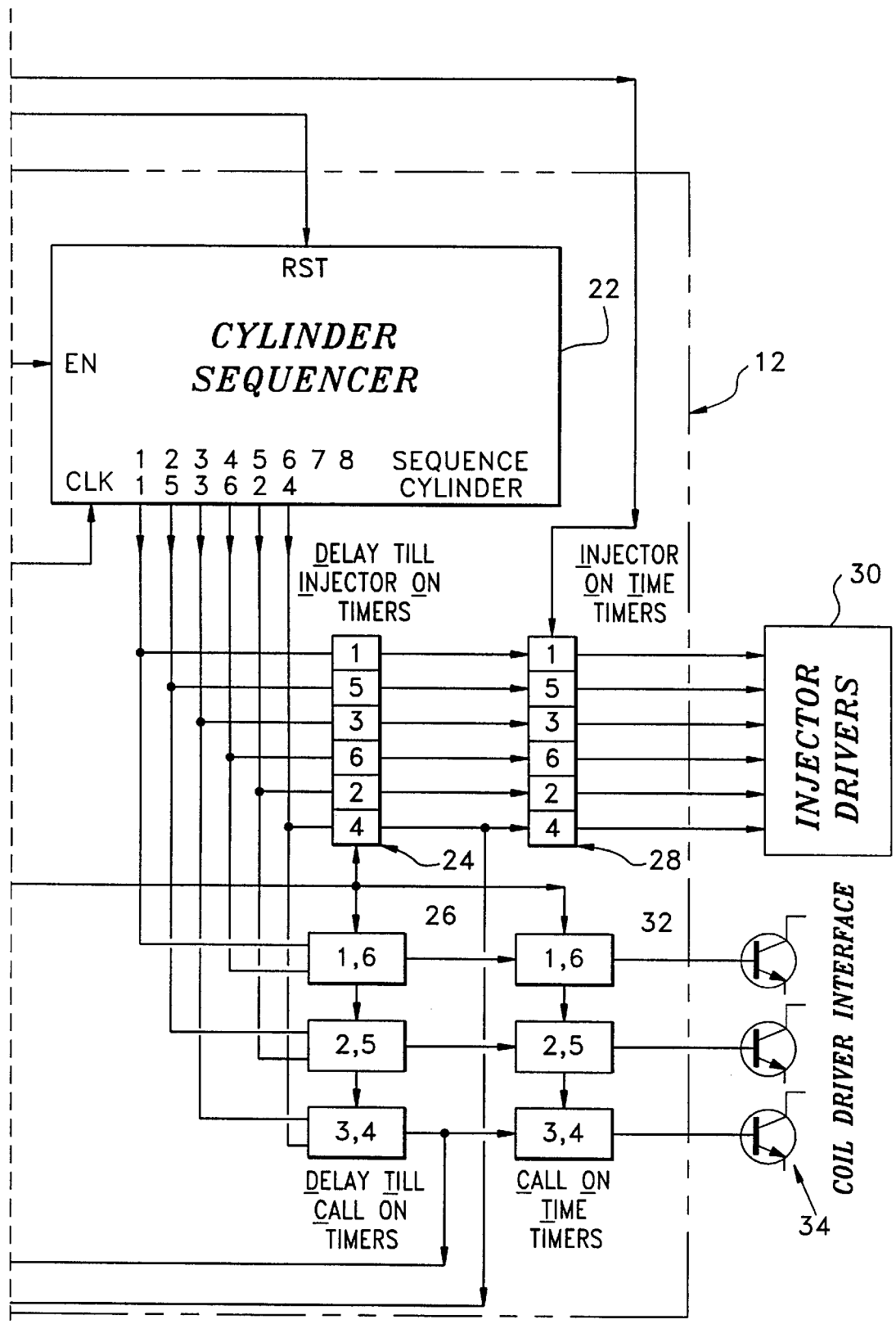

In this embodiment, the DTDC timer 18, DIO timers 24 and DCO timers 26 are programmable counters connected to the ECU controller via a common bus (not illustrated). In the top left hand corner of FIG. 1 an ECU interface 27 is indicated which enables the ECU controller to send and receive control and data signals asynchronously to and from various elements of the engine timing system. The common bus is indicated by the data, address, read and write lines. A crystal controlled clocking pulse line (TO) and a processor controlled reset line (RES) are also supplied. As described in WO 94/13946, the disclosure of which is incorporated herein by reference, the ECU controller calculates each injector delay (advance) and ON time (IOT) as well as the spark advance and coil ON time for each ignition coil pair. In the case of DTDC timer 18, DIO timers 24 and DCO timers 26 the timing calculations are supplied in the form of a count value indicating the delay duration in terms of the number of $\frac{1}{12}$ fly wheel tooth intervals (approximately 0.2° angular rotation) which are supplied to the timer/counters 18, 24 and 26 from PLL circuit 14.

The ECU controller calculates new count values at a sufficiently high rate that at the highest engine speeds each of the timers 24, 26 are updated at least once between gating pulses received from cylinder sequencer 22. The count value for Delay till Injector On Time is supplied to all six DIO timers 24 simultaneously, although for any particular cylinder this value may be updated several times before the sequence gating pulse arrives. Since the actual programmable delay is specified in terms of the number of $\frac{1}{12}$ FWT pulses, it can be precisely set in terms of ° Crank Angle before top dead centre regardless of the engine speed. Furthermore, being angle referenced each programmable delay at least maintains the last calculated advance setting regardless of changes in engine speed.

Once a sequenced injector is commanded to open, a corresponding one of a second set of timers, namely the Injector On Time (IOT) timers 28, controls the time for which a sequenced injector remains open. Unlike timers 24, 26 the IOT timers 28 are clocked by a crystal control time source (TO), typically providing a 1 MHz or faster pulse signal. The ECU controller calculates the IOT in fractions of milliseconds and supplies this value to the IOT timers 28 to control the duration of an electrical control signal supplied to injector drivers 30. As described in WO 94/15092 each injector is provided with a driver circuit which enables the injectors to open quickly whilst minimising electrical heating of the electromagnetic coil within the injector. The injector driver circuits initially apply a full potential difference to the injector coil allowing the current to peak at a maximum value to rapidly open the corresponding injector. Then the circuit reduces the current to a minimum value required to hold the injector open for the duration of the Injector On Time. Delays in the opening and closing of the injectors are built-in to the count values and IOT calculated by the ECU controller.

Three Coil On Time (COT) timers 32 control the time required by the sequenced ignition coil to reach it's specified charging current. This is a programmable time calculated by the ECU controller in terms of the number of $\frac{1}{12}$ FWT pulses supplied from PLL circuit 14. A count value is written to each of the COT timers 32 by the ECU controller in a similar manner to that for DIO timers 24 and DCO timers 26. A coil driver interface 34 receives the respective timer control signals from COT timers 32 and produces a higher level shifted control signal suitable for transmission to a remote coil power drive circuit.

The sequence controlling means 12 further comprises an end of sequence generator circuit 36 which produces an output signal when both end delays, (DIO timer 24 for cylinder 4 and DCO timer 26 for cylinders 3, 4), for injection and ignition have commenced for the last cylinder cycle. This is a validation signal to indicate that all timers in the chain of delays have successfully completed or started their count. An end of sequence counter 38 is employed by the ECU controller to count end of sequence pulses from the output of end of sequence generator 36 and is used by the ECU controller to make decisions on the validation process. End of sequence pulses from the end of sequence generator 36 are also supplied to the Delayed Top Dead Centre (DTDC) enable circuit 20 as a CLEAR pulse. The function of DTDC enable circuit 20 is to trap early or late TDC signals with respect to end of sequence pulses, either of which may have been caused improperly under electrically noisy conditions or by a faulty sensor or by faulty circuitry. This will halt the injection/ignition combustion process until a valid new combustion cycle is commenced by the next TDC pulse, in preference to the possibility of commencing the injecting and igniting timing sequence at the wrong time.

All of the control functions perform by the functional blocks of the electronic timing system described above, for example, cylinder sequencer 22 and timer/counters 24, 26, 32 are performed by standard digital integrated circuit chips. However, it will be obvious to persons skilled in the electronic arts that the same control functions can be performed by a different circuit arrangement, for example, by a single custom-designed integrated circuit using a Programmable Logic Array (PLA). Alternatively, a stand alone microprocessor, integral with or separate from the microprocessor of the ECU controller, can perform the same timing control functions.

Now that a preferred embodiment of the electronic engine timing system and method have been described in detail it will be apparent that numerous alterations and modifications may be made to the described embodiment, in addition to those already described, without departing from the basic inventive concepts. For example, it may not be essential that the engine cycle reference signal be based on the output signal from a fly wheel teeth position sensor. Any suitable means for detecting an operational position of the engine may be employed. All such variations and modifications are to be considered within the scope of the present invention, the nature of which is to be determined from the foregoing description and the appended claims.

I claim:

1. An electronic timing system for an internal combustion engine, the system comprising:

an engine gear wheel teeth position sensor for detecting the rotation of a gear wheel of the engine, wherein each gear tooth of a periphery of the gear wheel is detected as it passes said gear wheel teeth position sensor to generate a gear wheel teeth signal;

an engine phase sensor for detecting a phase of the engine and for generating an engine phase signal every cycle of the engine;

a signal multiplying means for multiplying said gear wheel teeth signal by an integer multiple of the number of cylinders, N, in the engine to produce a high resolution engine rotation signal in the form of a pulse train, each pulse in said pulse train indicating a predetermined angular displacement of the engine;

means for generating a cylinder cycle reference signal for initiating a timing activity for each individual cylinder of the engine, wherein said cylinder cycle reference signal is generated responsive to said high resolution engine rotation signal and engine phase signal such that a predetermined number of pulses of said high resolution engine rotation signal, corresponding to one cycle of the engine as indicated by said engine phase signal, is divided up into N equal cylinder timing intervals, each cylinder timing interval being marked by a cylinder cycle reference marker; and, means for controlling the timing of combustion in respective cylinders of the engine responsive to said high resolution engine rotation signal, said engine phase signal and said cylinder cycle reference markers whereby, in use, the timing of combustion in each engine cylinder can be more precisely controlled to coincide with a desired operational position of the engine.

2. An electronic timing system as claimed in claim 1, wherein said signal multiplying means is a phase locked loop circuit.

3. An electronic timing system as claimed in claim 1 or claim 2, wherein said means for controlling the timing of combustion comprises a plurality of programmable timers adapted to provide a programmable delay specified in terms of a number of pulses of said high resolution engine rotation signal supplied to the timers from said signal multiplying means, for controlling the timing activity for each cylinder using said cylinder cycle reference markers as a timing reference.

4. An electronic timing system as claimed in claim 3, wherein said programmable delay is specified by an engine control unit and periodically updated by the engine control unit in response to changes in various operating parameters of the engine, including engine speed, desired load, delays in the opening of fuel injectors, delays in the transport of fuel from the injectors to the cylinders and delays in combustion after initiation of ignition.

5. An electronic timing system as claimed in claim 4, wherein N programmable Delay till Injector On (DIO) timers are provided, each DIO timer producing a programmable delay indicative of a point in the cycle of a cylinder, specified in terms of the angular displacement of the engine, at which a corresponding fuel injector is required to open to deliver fuel to said cylinder.

6. An electronic timing system as claimed in claim 5, wherein N programmable Injector On Time (IOT) timers are also provided, connected in series with and enabled by a corresponding one of said N programmable DIO timers, each IOT timer producing a programmable delay indicative of a time duration for which a corresponding fuel injector is required to remain open, and wherein said programmable delay is specified and periodically updated by said engine control unit.

7. An electronic timing system as claimed in claim 4, wherein N/2 programmable Delay till Coil On (DCO) timers are provided, each DCO timer producing a programmable delay indicative of a point in the cycle of a cylinder, specified in terms of the angular displacement of the engine, at which a corresponding ignition coil is required to commence charging.

8. An electronic timing system as claimed in claim 7, wherein N/2 programmable Coil On Time (COT) timers are provided, connected in series with and enabled by a corresponding one of said N/2 programmable DCO timers, each COT timer producing a programmable delay indicative of a time duration, specified in terms of the angular displacement of the engine, required by a corresponding ignition coil to reach a specified charging current.

9. An electronic timing system as claimed in claim 4, wherein said means for controlling the timing of combustion further comprises a cylinder sequencing means for generating timing control signals for indicating the individual cycle periods for each engine cylinder in the correct sequence responsive to said engine phase signal and said cylinder cycle reference markers, said timing control signals being supplied as gating signals to said programmable timers.

10. An electronic timing system as claimed in claim 1, wherein said gear wheel is the engine fly wheel and said gear wheel teeth position sensor generates a fly wheel teeth signal, and wherein said engine is a gas fuelled internal combustion engine.

11. A method of electronic timing for an internal combustion engine, the method comprising:

detecting the rotation of a gear wheel of the engine, wherein each gear tooth on a periphery of the gear wheel is detected to generate a gear wheel teeth signal;

detecting a phase of the engine and generating an engine phase signal every cycle of the engine;

multiplying said gear wheel teeth signal by an integer multiple of the number of cylinders, N, in the engine to produce a high resolution engine rotation signal in the form of a pulse train, each pulse in said pulse train indicating a predetermined angular displacement of the engine;

generating a cylinder cycle reference signal for initiating a timing activity for each individual cylinder of the engine, wherein said cylinder cycle reference signal is generated responsive to said high resolution engine rotation signal and engine phase signal such that a predetermined number of pulses of said high resolution engine rotation signal, corresponding to one cycle of the engine as indicted by said engine phase signal, is divided up into N equal cylinder timing intervals, each cylinder timing interval being marked by a cylinder cycle reference marker; and, controlling the timing of combustion in respective cylinders of the engine responsive to said high resolution engine rotation signal, said cylinder cycle reference markers and said engine phase signal whereby, in use, the timing of combustion in each engine cylinder can be more precisely controlled to coincide with a desired operational position of the engine.

12. A method of electronic timing as claimed in claim 11, wherein said step of controlling the timing of combustion comprises providing a programmable delay specified in terms of a number of pulses of said high resolution engine rotation signal for controlling the timing activity for each cylinder using said cylinder cycle reference markers as a timing reference.

13. A method of electronic timing as claimed in claim 12, wherein said programmable delay is specified and periodically updated in response to changes in various operating parameters of the engine, including engine speed, desired load, delays in the opening of fuel injectors, delays in the transport of fuel from the injectors to the cylinders and delays in combustion after initiation of ignition.

14. A method of electronic timing as claimed in claim 13, wherein a programmable Delay till Injector On (DIO) is produced for a fuel injector corresponding to each cylinder of the engine, said programmable DIO being indicative of a point in the cycle of a cylinder, specified in terms of the angular displacement of the engine, at which the corresponding fuel injector is required to open to deliver fuel to said cylinder.

15. A method of electronic timing as claimed in claim 14, wherein a programmable Injector On Time (IOT) is also produced, indicative of a time duration for which the corresponding fuel injector is required to remain open.

16. A method of electronic timing as claimed in claim 13, wherein a programmable Delay till Coil On (DCO) is produced for an ignition coil corresponding to each cylinder of the engine, said programmable DCO being indicative of a point in the cycle of a cylinder, specified in terms of the angular displacement of the engine, at which the corresponding ignition coil is required to commence charging.

17. A method of electronic timing as claimed in claim 16, wherein a programmable Coil On Time (COT) is also produced, indicative of a time duration, specified in terms of the angular displacement of the engine, required by the corresponding ignition coil to reach a specified charging current.

18. A method of electronic timing as claimed in claim 11, wherein said gear wheel is the engine fly wheel and said gear wheel teeth signal is a fly wheel teeth signal, and wherein said engine is a gas fuelled internal combustion engine.

* * * * *